United States Patent
Kato et al.

(10) Patent No.: US 9,724,683 B2
(45) Date of Patent: Aug. 8, 2017

(54) CATALYST STRUCTURE

(71) Applicant: BABCOCK-HITACHI KABUSHIKI KAISHA, Tokyo (JP)

(72) Inventors: Yasuyoshi Kato, Hiroshima (JP); Keiichiro Kai, Hiroshima (JP); Kenichi Arakawa, Hiroshima (JP); Naomi Imada, Hiroshima (JP)

(73) Assignee: MITSUBISHI HITACHI POWER SYSTEMS, LTD., Yokohama-Shi (JP)

( * ) Notice: Subject to any disclaimer, the term of this patent is extended or adjusted under 35 U.S.C. 154(b) by 135 days.

(21) Appl. No.: 14/414,900

(22) PCT Filed: Jul. 11, 2013

(86) PCT No.: PCT/JP2013/068985
§ 371 (c)(1),
(2) Date: Jan. 15, 2015

(87) PCT Pub. No.: WO2014/013933
PCT Pub. Date: Jan. 23, 2014

(65) Prior Publication Data
US 2015/0182958 A1   Jul. 2, 2015

(30) Foreign Application Priority Data

Jul. 18, 2012 (JP) .................. 2012-159827

(51) Int. Cl.
*B01D 50/00* (2006.01)
*B01J 35/02* (2006.01)
(Continued)

(52) U.S. Cl.
CPC .......... *B01J 35/02* (2013.01); *B01D 53/8631* (2013.01); *B01D 53/88* (2013.01); *B01J 19/249* (2013.01);
(Continued)

(58) Field of Classification Search
CPC .......... F01N 2330/38; B01J 2219/2435; B01J 2219/246; B01J 2523/47; B01J 2523/00; B01J 2523/68
(Continued)

(56) References Cited

U.S. PATENT DOCUMENTS 4,152,302 A   5/1979   Nonnenmann et al.

FOREIGN PATENT DOCUMENTS

| JP | 57552/1974 | 5/1974 |
| JP | 50128681 | 10/1975 |

(Continued)

OTHER PUBLICATIONS

International Search Report for PCT/JP2013/068985 dated Sep. 17, 2013.
(Continued)

*Primary Examiner* — Tom P Duong
(74) *Attorney, Agent, or Firm* — Heslin Rothenberg Farley & Mesiti P.C.

(57) ABSTRACT

Provided is a catalyst structure which prevents an increase in pressure loss by a simple construction while the gas flow is efficiently stirred by a structure making contact between adjacent catalyst elements. The catalyst structure is provided with a first flat-plate part and a second flat-plate part which support, on surfaces thereof, a constituent having catalytic activity to an exhaust gas and face each other, and a stirring part which is provided in such a manner as to come into contact first with the first flat-plate part and the second flat-plate part in an extending manner from the first flat-plate part to the second flat-plate part at a prescribed angle with respect to the direction in which the exhaust gas flows.

6 Claims, 16 Drawing Sheets

(51) Int. Cl.
| | |
|---|---|
| *B01J 23/28* | (2006.01) |
| *B01D 53/86* | (2006.01) |
| *B01D 53/88* | (2006.01) |
| *B01J 37/02* | (2006.01) |
| *B01J 23/00* | (2006.01) |
| *B01J 35/06* | (2006.01) |
| *B01J 37/00* | (2006.01) |
| *B01J 19/24* | (2006.01) |

(52) U.S. Cl.
CPC ............ *B01J 23/002* (2013.01); *B01J 23/28* (2013.01); *B01J 35/06* (2013.01); *B01J 37/0009* (2013.01); *B01J 37/0045* (2013.01); *B01J 37/0225* (2013.01); *B01J 2219/246* (2013.01); *B01J 2219/2453* (2013.01); *B01J 2219/2459* (2013.01); *B01J 2219/2474* (2013.01); *B01J 2219/2479* (2013.01); *B01J 2219/32241* (2013.01); *B01J 2219/32251* (2013.01); *B01J 2219/32466* (2013.01); *B01J 2523/00* (2013.01); *F01N 2330/38* (2013.01); *F01N 2330/48* (2013.01)

(58) Field of Classification Search
USPC .................... 422/177, 180; 55/520–523, 525
See application file for complete search history.

(56) References Cited

FOREIGN PATENT DOCUMENTS

| | | | |
|---|---|---|---|
| JP | 5479188 | A | 6/1979 |
| JP | 5973053 | A | 4/1984 |
| JP | 6027807 | B2 | 7/1985 |
| JP | 1130736 | A | 5/1989 |
| JP | 910599 | A | 1/1997 |
| JP | 2004141835 | A | 5/2004 |
| JP | 2005296819 | A | 10/2005 |
| WO | 0013775 | A1 | 3/2000 |

OTHER PUBLICATIONS

Office Action for corresponding Japanese patent application No. JUS47-191668 dated May 17, 2016, with English translation.
Office Action for corresponding Chinese patent application No. 201380037866.3 dated Apr. 1, 2016, with English translation.

FIG. 2
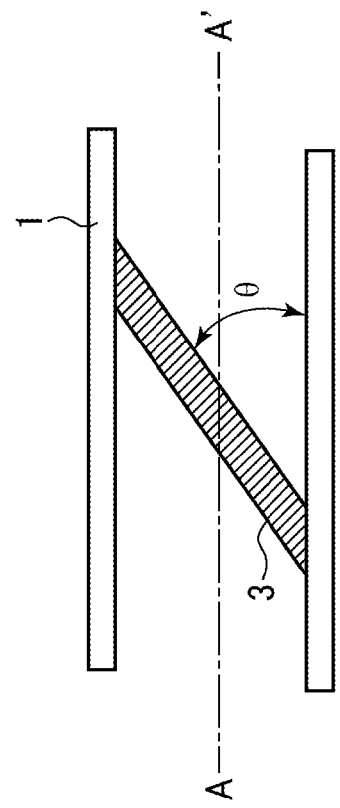
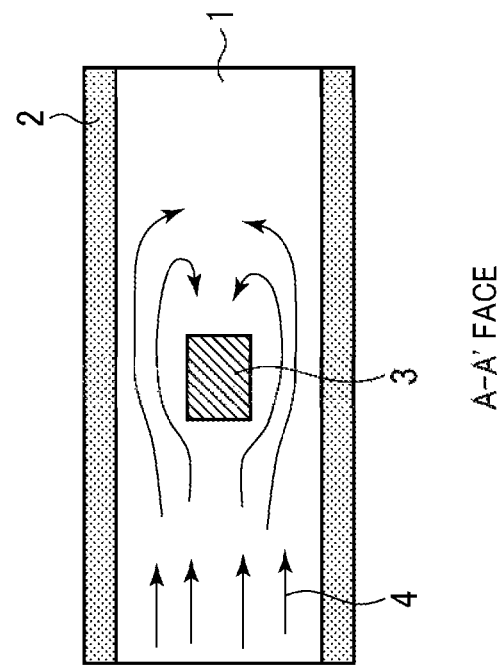

FIG. 15

| ITEM | NUMERICAL VALUE |
|---|---|
| EXHAUST GAS TEMPERATURE | 350°C |
| EXHAUST GAS FLOW VELOCITY | 7m/s |
| STACKED CATALYST SIZE | 150mm SQUARE<br>LENGTH 600mm |
| AV (CATALYST AREAL VELOCITY) | 38m/h |
| KIND OF EXHAUST GAS<br>CONCENTRATION OF $NO_x$<br>CONCENTRATION OF $NH_3$ | LPG COMBUSTION EXHAUST GAS<br>80ppm<br>96ppm |

FIG. 16

| DIVISION | DENITRIFICATION RATE (%) | PRESSURE LOSS (mmH$_2$O/m) |
|---|---|---|
| EMBODIMENT 1 | 86 | 56 |
| EMBODIMENT 2 | 92 | 50 |
| EMBODIMENT 3 | 89 | 83 |
| EMBODIMENT 4 | 93 | 67 |
| EMBODIMENT 5 | 91 | 57 |
| EMBODIMENT 6 | 86 | 42 |
| COMPARATIVE EXAMPLE 1 | 65 | 43 |
| COMPARATIVE EXAMPLE 2 | 83 | 78 |

CATALYST STRUCTURE

CROSS REFERENCE TO RELATED APPLICATIONS

This application is the U.S. National Filing of PCT Application No. PCT/JP2013/068958 filed on Jul. 11, 2013 and published in Japanese as WO 2014/013933 A1 on Jan. 23, 2014, and claims priority of Japanese application JP 2012-159827 filed on Jul. 18, 2012, the entire disclosure of these applications being hereby incorporated herein by reference.

TECHNICAL FIELD

The present invention relates to a catalyst structure and, more particularly, to a structure of a catalyst component for a catalytic reaction apparatus which purifies combustion exhaust gases.

BACKGROUND ART

Nitrogen oxides in exhaust gases discharged from power plants, various kinds of plants and factories, automobiles and the like are causative substances of photochemical smog and acid rain. The exhaust gas denitrification process by selective catalytic reduction with ammonia ($NH_3$) etc. as a reducing agent is widely used in thermal power plants and the like in order to effectively remove nitrogen oxides.

As catalysts, titanium-oxide ($TiO_2$)-base catalysts are used which include vanadium (V), molybdenum (Mo), tungsten (W) and the like as active constituents. In particular, catalysts containing vanadium as one of active constituents have become mainflow of present denitrification catalysts because these catalysts not only have high activity, but also less deteriorates due to impurities contained in exhaust gases and hence can be used at lower temperatures (for example, Patent Literature 1).

Catalyst structures are shaped in such structures as a honeycomb structure and a plate-like structure and various methods of manufacturing a catalyst structure have been proposed. For example, there have been proposed catalyst structures in which a net-like object made of a thin metal sheet formed into a metal lath, and a woven cloth or nonwoven cloth of ceramic fiber are used as a base, and plate-like catalyst structures, each of which is obtained by applying and pressure bonding a catalyst constituent to this base and is corrugated, are stacked on each other (for example, Patent Literature 2 and Patent Literature 3). These inventions have excellent features, such as small ventilation losses and low susceptibility to clogging by soot and dust and combustion ash of coal, and are used in great numbers in exhaust gas denitrification devices of thermal power generation boilers.

Also, there have been proposed catalyst structures in which a weir-like protrusion is provided in a flat portion of a catalyst and the occurrence of gas flow boundary layers formed on gas-catalyst surfaces is prevented (for example, Patent Literature 4).

Furthermore, there have been proposed catalyst structures in which gas dispersions made of metal, ceramics or glass are stacked alternately with a plate-like catalyst (for example, Patent Literature 5).

CITATION LIST

Patent Literature

Patent Literature 1: JP-A-50-128681
Patent Literature 2: JP-A-54-79188
Patent Literature 3: JP-A-59-73053
Patent Literature 4: JP-A-9-10599
Patent Literature 5: International Publication No. WO00-13775

SUMMARY OF INVENTION

Technical Problem

In conventional catalyst structures, a weir-like protrusion is provided in a flat portion of a catalyst and the gas flow is disturbed by this weir-like protrusion, thereby contributing to an improvement in activity. However, in order to obtain a sufficient turbulence effect, it is necessary to provide a large number of weir-like protrusions and to provide high weir-like protrusions, which are apt to incur an increase in pressure loss, leaving room for improvement.

And in conventional catalyst structures, the method of stacking gas dispersions made of metal, ceramics or glass alternately with a plate-like catalyst can efficiently disturb the gas flow in the central portion of a unit plate-like catalyst (a catalyst element) in stacked layers (the central portion of an adjacent flat-plate part). However, some contrivance becomes necessary to install gas dispersions (bar-like bodies and the like) at prescribed intervals in a catalyst element.

An object of the present invention is to provide a catalyst structure which prevents an increase in pressure loss by a simple construction while the gas flow is efficiently stirred by a structure making contact between adjacent catalyst elements.

Solution to Problem

The catalyst structure of the present invention is provided with a first flat-plate part and a second flat-plate part which support, on surfaces thereof, a constituent having catalytic activity to an exhaust gas and face each other; and a stirring part which is provided in such a manner as to come into contact with the first flat-plate part and the second flat-plate part in an extending manner from the first flat-plate part to the second flat-plate part at a preset angle with respectively to the direction in which the exhaust gas flows.

According to this configuration, it is possible to provide a catalyst structure which prevents an increase in pressure loss by a simple construction while the gas flow is efficiently stirred by a structure making contact between adjacent catalyst elements.

In the catalyst structure of the present invention, the stirring part is composed of inorganic fiber which is impregnated with a constituent having catalytic activity to an exhaust gas.

According to this configuration, the use of inorganic fiber which is impregnated with a constituent having catalytic activity makes the construction simple, enabling the effect of catalytic activity to be enhanced.

In the catalyst structure of the present invention, the stirring part includes a lead part which is formed by folding an incision provided in the second flat-plate part.

According to this configuration, the productivity and strength of the catalyst structure increase because the working of the lead part is easy, and the flow of the gas in other flow passages is facilitated because an opening is formed in the portion where the lead part is cut and raised, enabling the reaction efficiency of the catalyst to be further enhanced.

The catalyst structure of the present invention is provided with a third flat-plate part which faces the second flat-plate part on the side opposite to the first flat-plate part, and the lead part folded to the side of the first flat-plate part and the lead part folded to the side of the third flat-plate part are present alternately in the direction in which the exhaust gas flows.

According to this configuration, by alternately folding the stirring parts (the lead parts) in opposite directions, it is possible to efficiently facilitate the flow of the gas in other flow passages through an opening, enabling the effect of catalytic activity to be improved.

In the catalyst structure of the present invention, the lead part is present neither in the first flat-plate part nor in the third flat-plate part.

According to this configuration, it is possible to efficiently facilitate the flow of the gas in other flow passages through an opening, enabling the effect of catalytic activity to be improved.

In the catalyst structure of the present invention, the stirring part includes a lead part which is formed by folding an incision provided in the first flat-plate part, and the lead part provided in the first flat-plate part and the lead part provided in the second flat-plate part are folded in substantially the same direction, and are present alternately in the direction in which the exhaust gas flows.

According to this configuration, the lead part provided in the first flat-plate part and the lead part provided in the second flat-plate part are folded in substantially the same direction, and are caused to be present alternately in the direction in which the gas flows, whereby it is possible to efficiently facilitate the flow of the gas in other flow passages through an opening, enabling the effect of catalytic activity to be improved.

The catalyst structure of the present invention is provided with a third flat-plate part which faces the second flat-plate part on the side opposite to the first flat-plate part, the stirring part includes a lead part which is formed by folding an incision provided in the third flat-plate part, and the lead part provided in the second flat-plate part and the lead part provided in the third flat-plate part are folded in substantially the same direction, and are present alternately in the direction in which the exhaust gas flows.

According to this configuration, the lead part provided in the second flat-plate part and the lead part provided in the third flat-plate part are folded in substantially the same direction, and are caused to be present alternately in the direction in which the gas flows, whereby it is possible to efficiently facilitate the flow of the gas in other flow passages through an opening, enabling the effect of catalytic activity to be improved.

Furthermore, according to this configuration, it is possible to substantially reduce the resistance due to the gas which flows by passing the stirring part while increasing the contact rate of the exhaust gas and the stirring body.

In the catalyst structure of the present invention, the stirring parts are present in multiple numbers in the direction in which the exhaust gas flows and intervals between the respective stirring parts are not less than 30 mm but not more than 100 mm.

According to this configuration, it is possible to provide a catalyst structure which efficiently stirs a gas flow while preventing an increase in pressure loss.

Advantageous Effect of Invention

The present invention can provide a catalyst structure which prevents an increase in pressure loss by a stirring part provided between a first flat-part part and a second flat-plate part, which face each other, in such a manner as to come into contact with the flat-plate parts while the gas flow is efficiently stirred by a structure making contact between adjacent catalyst elements.

BRIEF DESCRIPTION OF DRAWINGS

FIGS. 2(a) and 2(b) are diagrams showing a catalyst structure in which the angle of a stirring part to the gas flow direction is not less than 5° but not more than 30°.

FIG. 15 is a table showing measurement conditions of the denitrification rate and pressure loss of a stacked catalyst structure.

FIG. 16 is a table showing measurement results of the denitrification rate and pressure loss of stacked catalyst structures.

DESCRIPTION OF EMBODIMENTS

Figure 1:
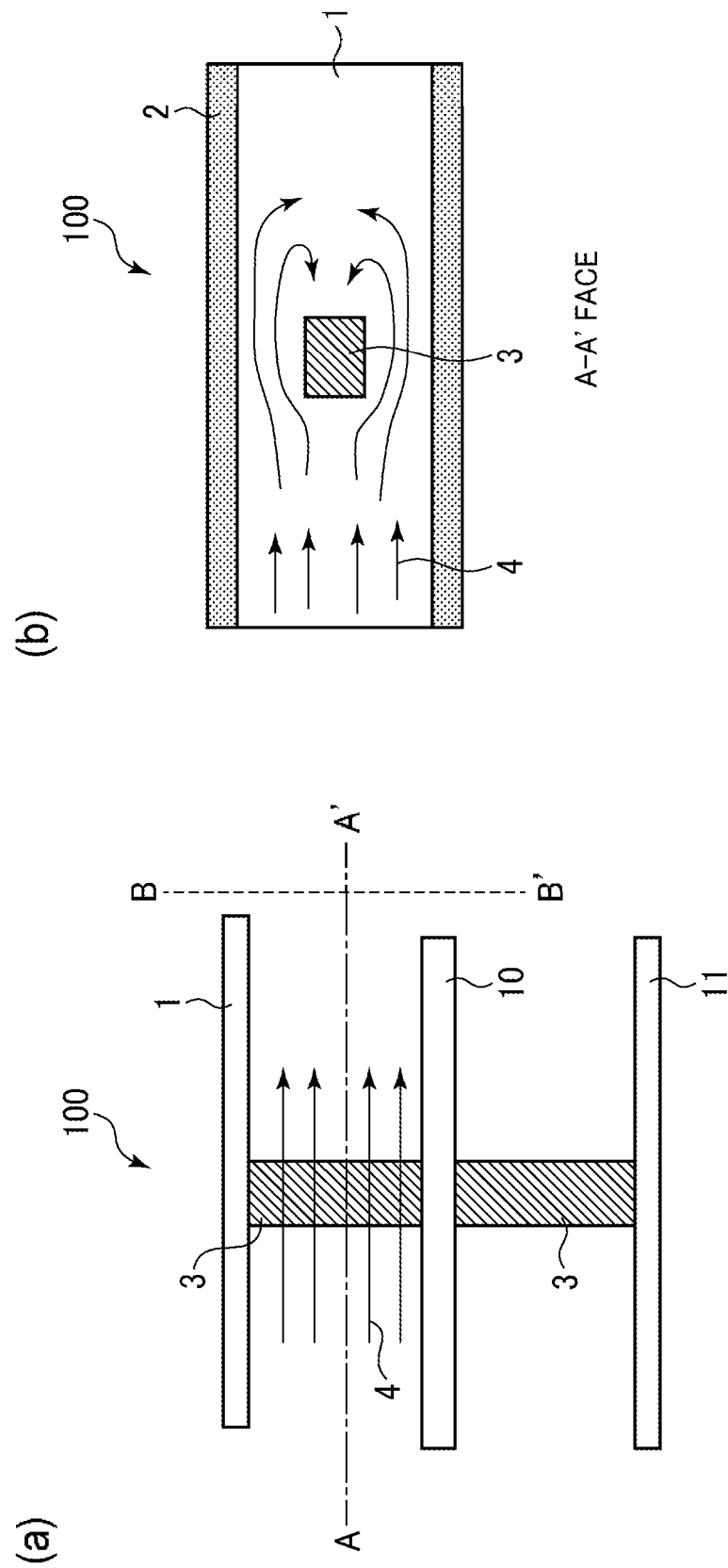
FIGS. 1(a) and 1(b) are diagrams showing an example of the configuration of a catalyst structure of an embodiment.

Catalyst structures of embodiments of the present invention will be described below with the aid of the drawings. An example of a configuration of a catalyst structure of an embodiment is shown in FIGS. 1(a) and 1(b). In this embodiment, a description will be given of a denitrification catalyst structure used to remove nitrogen oxides contained in combustion exhaust gases. As shown in FIGS. 1(a) and 1(b), flat-plate parts (catalyst elements) 1, 10, 11 are stacked. Each of the flat-plate parts (the catalyst elements) 1, 10, 11 is held at given intervals by a spacer 2 and an exhaust gas flows between the flat-plate parts (the catalyst elements) 1, 10, 11.

As shown in FIG. 1(a), a catalyst structure 100 is provided with a first flat-plate part 1, a second flat-plate part 10, and a stirring part 3. The first flat-plate part 1 and the second flat-plate part 10 support, on surfaces thereof, a constituent having catalytic activity to an exhaust gas, and face each other. The stirring part 3 is provided in such a manner as to come into contact with the first flat-plate part 1 and the second flat-plate part 10 in an extending manner from the first flat-plate part 1 to the second flat-plate part 10 at a prescribed angle with respectively to the direction in which the exhaust gas flows (the gas flow direction) 4 (for example, not less than 0° but not more than 90°). Here, the stirring part 3 performs the function of reinforcing the spacer 2 of the flat-plate parts 1, 10.

The catalyst structure 100 is provided with a third flat-plate part 11. The third flat-plate part 11 faces the second flat-plate part 10 on the side opposite to the first flat-plate part 1. In this manner, the flat-plate parts (the catalyst elements) are stacked in the B-B' direction. Each of the flat-plate parts 1, 10, 11 becomes a catalyst element.

FIG. 1(*b*) is a diagram which schematically shows the flow of the exhaust gas in a sectional view in the A-A' direction, which is the central portion between the catalyst elements. As shown in FIG. 1(*b*), it is possible to improve catalytic activity by disturbing (stirring) the gas in the central portion of the gas flow passage between the catalyst elements. That is, the stirring part 3 stirs the gas which passes the central portion of the gas flow passage.

And, as shown in FIGS. 2(*a*) and 2(*b*), an experiment was conducted on the effect of catalytic activity by changing the angle of the stirring part 3 to the gas flow direction 4 and by providing the stirring part 3 at angles of not less than 5° but not more than 30°, it was possible to increase the contact rate of the exhaust gas and the stirring body and hence it was possible to substantially reduce the resistance due to the gas which flows by passing the stirring part 3.

As shown in FIGS. 1(*a*) and 1(*b*) and FIGS. 2(*a*) and 2(*b*), the stirring part 3 may be provided in such a manner as to come into contact with the first flat-plate part 1 and the second flat-plate part 10 in an extending manner from the first flat-plate part 1 to the second flat-plate part 10 as a member which reinforces the spacer 2, and may also be made of inorganic fiber which is impregnated with a constituent having catalytic activity to the exhaust gas. Also, the stirring part 3 may include a lead part which is formed by folding an incision provided in the second flat-plate part 10.

Figure 3:
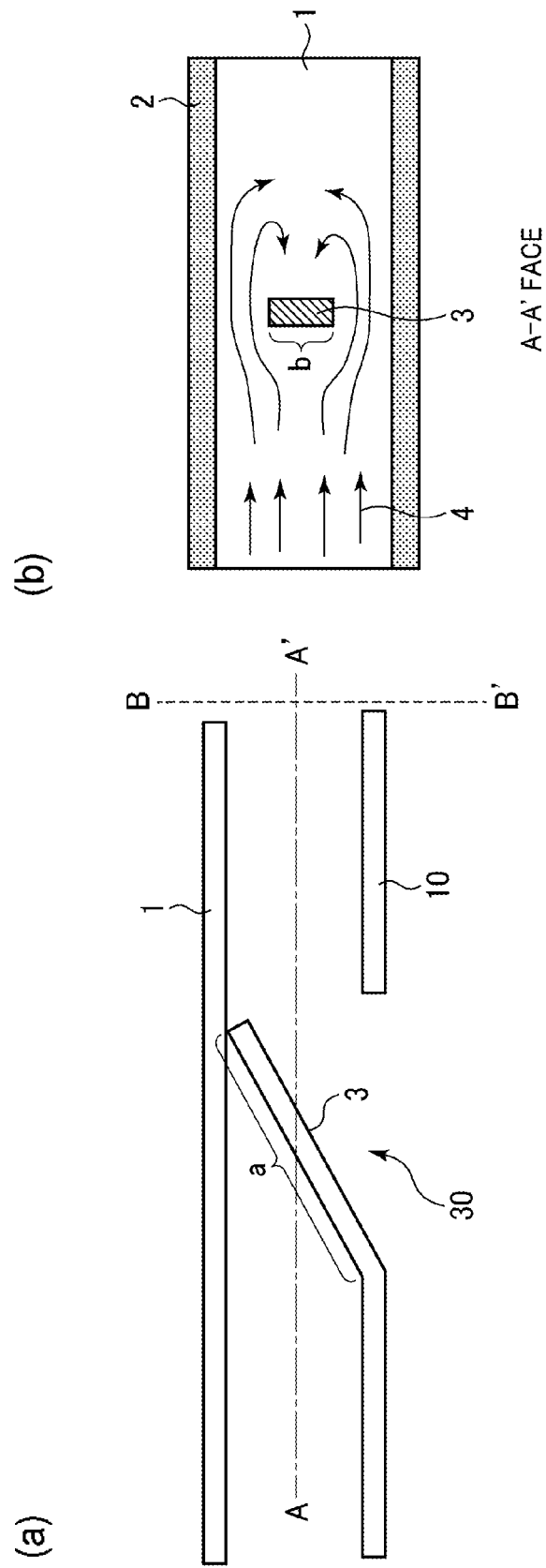
FIGS. 3(a) and 3(b) are diagrams showing a catalyst structure in which a portion of the flat-plate part of a plate-like catalyst is subjected to incision working, and this portion is cut and raised like a lead.

For example, in the stirring part 3, catalyst elements may be stacked by providing protrusions in which bulky inorganic fiber is impregnated with a catalyst constituent between catalyst elements in such a manner as to come into contact with the catalyst elements. Furthermore, as shown in FIG. 3(*a*), a portion of the flat-plate parts 1, 10, 11 of a plate-like catalyst is subjected to incision working and this portion is cut and raised like a lead so that stacking is performed to ensure that a front edge of the lead part comes into contact with other catalyst element faces which are stacked. In the case where catalyst elements are stacked by providing a lead part, because the working of the lead part is easy and the lead part functions as a member which reinforces the spacer 2, the productivity and strength of the catalyst structure increase. As shown in FIG. 3(*b*), it is possible to improve catalytic activity by disturbing (stirring) the gas in the central portion of the gas flow passage between catalyst elements. That is, the stirring part 3 stirs the gas which passes the central portion of the gas flow passage.

Figure 4:
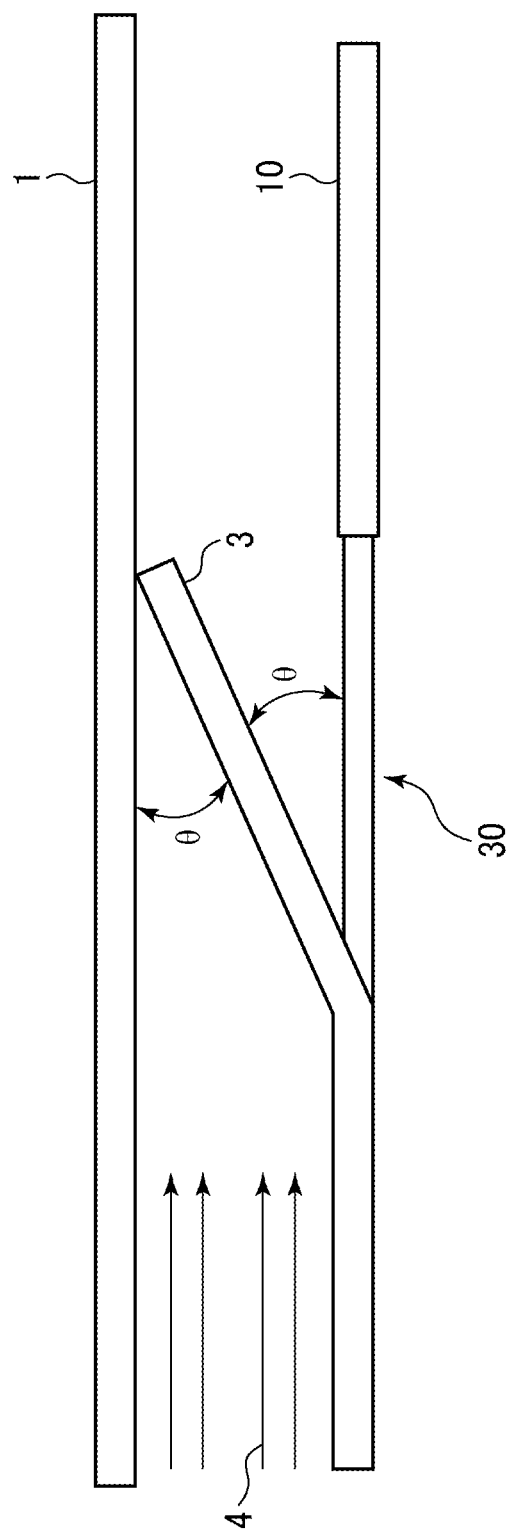
FIG. 4 is a diagram showing a catalyst structure in which the angle of a lead part to the gas flow direction is not less than 5° but not more than 30°.

FIG. 4 is a diagram showing that the stirring part 3 is the lead part. The stirring part 3 (the lead part) is formed by folding an incision provided in the second flat-plate part 10 and is provided in such a manner as to come into contact first with the first flat-plate part 1 and then with the second flat-plate part 10 at a prescribed angle θ to the gas flow direction 4.

Figure 5:
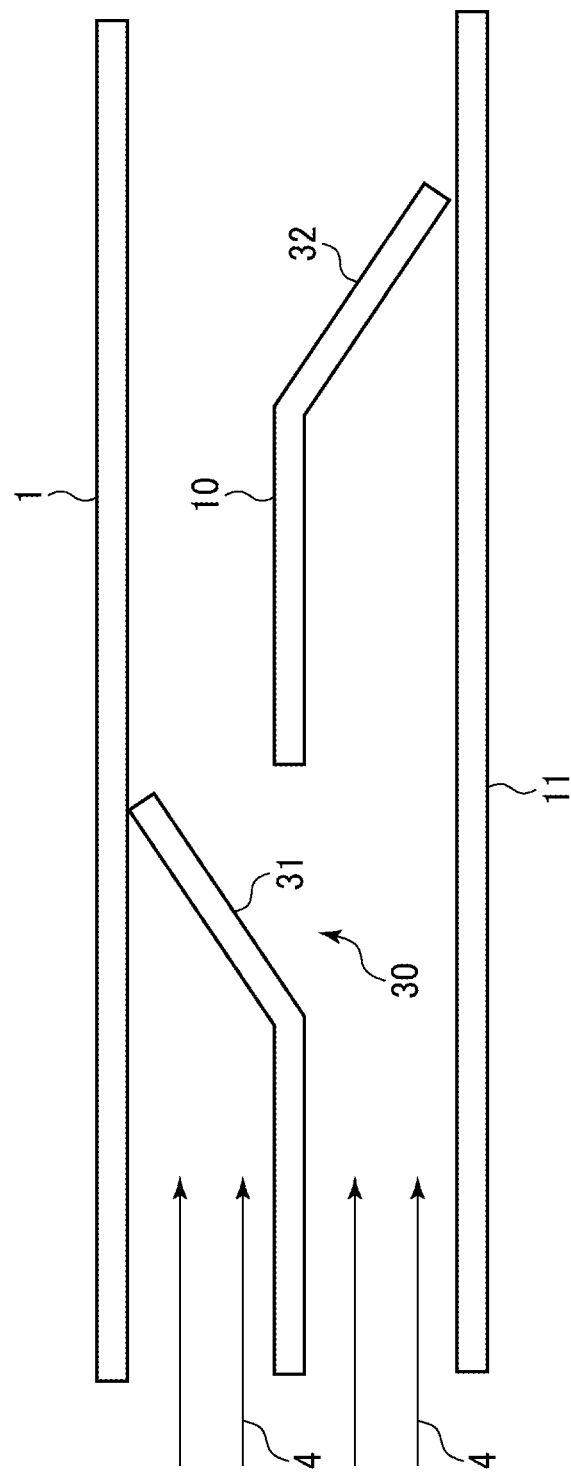
FIG. 5 is a diagram showing a catalyst structure in which the folding directions of stirring parts (lead parts) are alternately opposite directions.

FIG. 5 is a diagram showing a catalyst structure in which the folding directions of the stirring parts (the lead parts) 3 are alternately opposite directions. As shown in FIG. 5, the first flat-plate part 1 and the second flat-plate part 10 support, on surfaces thereof, a constituent having catalytic activity to the exhaust gas and face each other. The third flat-plate part 11 faces the second flat-plate part 10 on the side opposite to the first flat-plate part 1.

Figure 6:
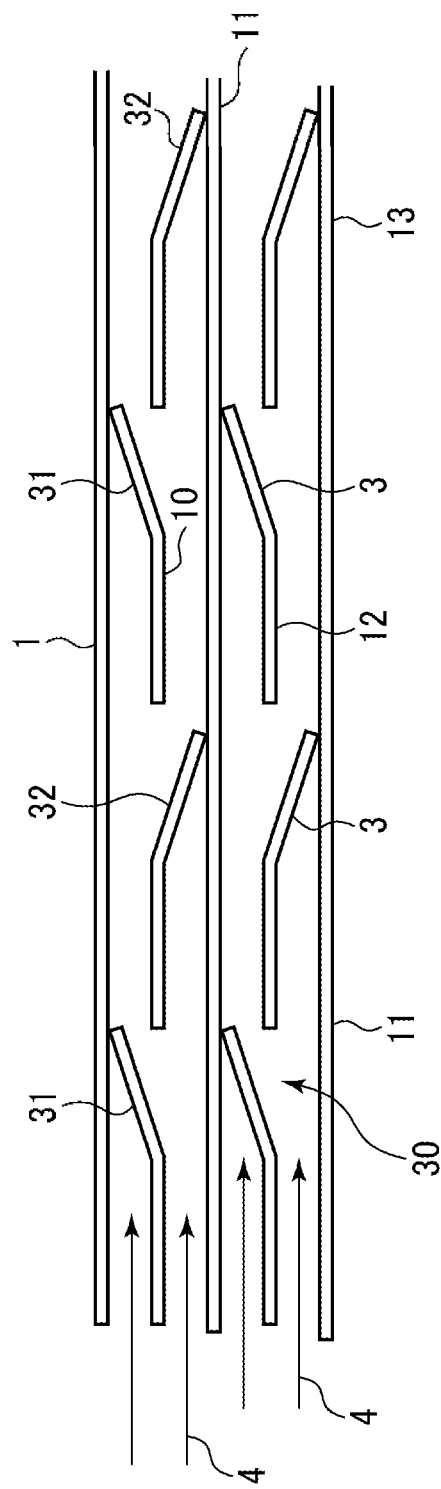
FIG. 6 is a diagram showing a catalyst structure which is such that catalyst elements in which the folding directions of the stirring parts (the lead parts) are alternately opposite directions are stacked.

The stirring part (the lead part) 3 is formed by folding an incision provided in the second flat-plate part 10. And a lead part 31 folded to the side of the first flat-plate part 1 and a lead part 32 folded to the side of the third flat-plate part 11 are present alternately in the direction 4 in which the exhaust gas flows. And as shown in FIG. 6, the catalyst elements 10, 12 in which the folding directions of the stirring parts (the lead parts) 3 are alternately opposite directions may be stacked. In this case, as shown in FIGS. 5 and 6, it is also possible to ensure that the stirring part (the lead part) 3 is present neither in the first flat-plate part 1 nor in the third flat-plate part 11.

Figure 7:
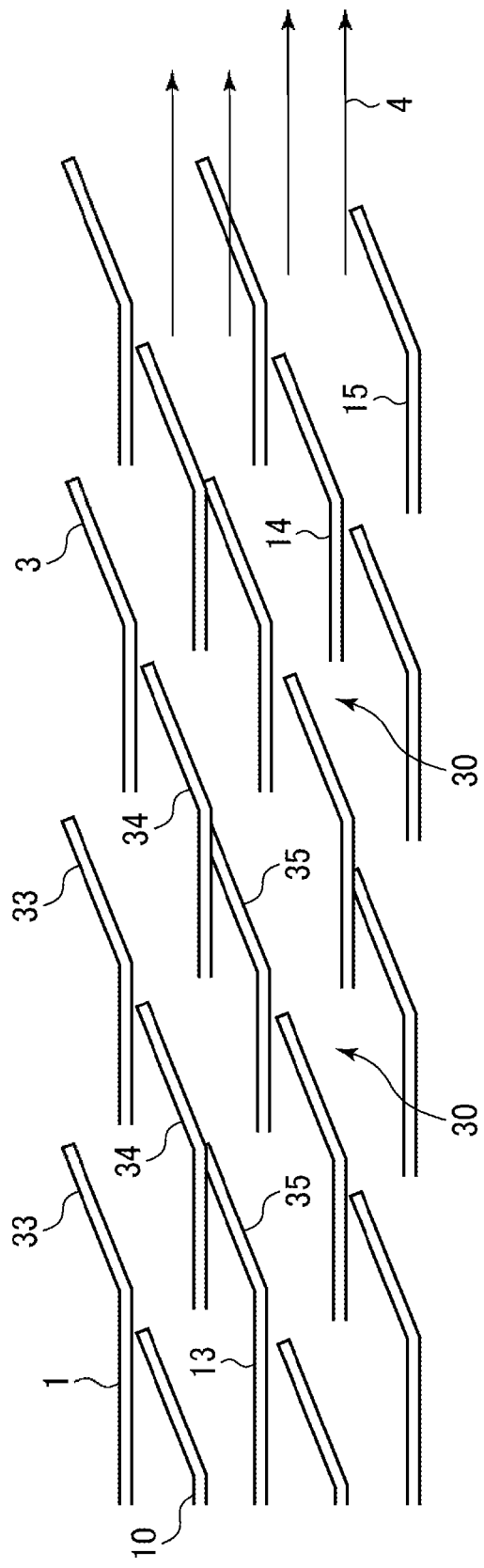
FIG. 7 is a diagram showing a catalyst structure in which the folding directions of the stirring parts (the lead parts) are substantially the same direction.

FIG. 7 is a diagram showing a catalyst structure in which the folding directions of the stirring parts (the lead parts) 3 are substantially the same direction. As shown in FIG. 7, the first flat-plate part 1 and the second flat-plate part 10 support, on surfaces thereof, a constituent having catalytic activity to the exhaust gas and face each other. The third flat-plate part 13 faces the second flat-plate part 10 on the side opposite to the first flat-plate part 1.

The stirring part (the lead part) 3 is formed by folding an incision provided in the second flat-plate part 10. And a lead part 33 provided in the first flat-plate part 1 and a lead part 34 provided in the second flat-plate part 10 are folded in substantially the same direction and are present alternately in the direction 4 in which the exhaust gas flows. It is also possible to adopt a configuration in which the stirring part (the lead part) 3 is formed by folding an incision provided in the third flat-plate part 13, and that the lead part 34 provided in the second flat-plate part 10 and a lead part 35 provided in the third flat-plate part 13 are folded in substantially the same direction and are present alternately in the direction 4 in which the exhaust gas flows.

Next, the flow of the exhaust gas in the catalyst structure of this embodiment will be described with the aid of FIG. 8. And the flow of the exhaust gas in catalyst structures of comparative examples will be described with the aid of FIGS. 9 and 10.

Figure 8:
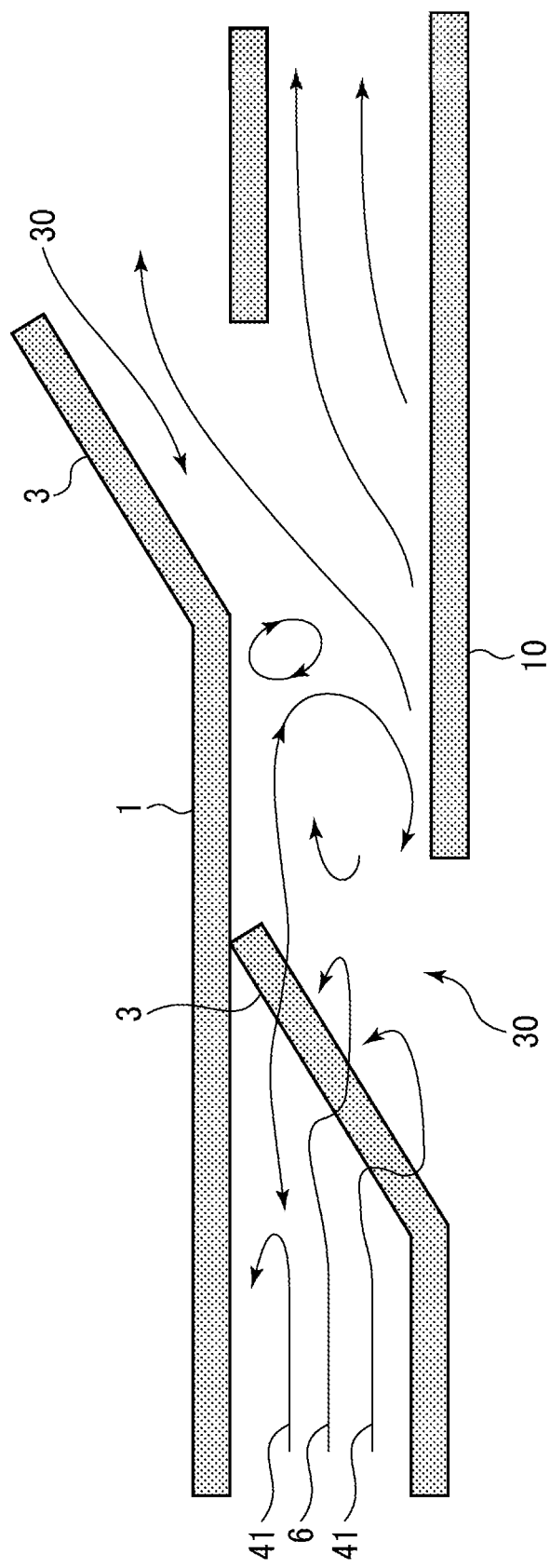
FIG. 8 is a diagram to explain the flow of the exhaust gas in a catalyst structure in an embodiment.

As shown in FIG. 8, the stirring part (the lead part) 3 is formed in such a manner as to come into contact with the first flat-plate part 1 and the second flat-plate part 10. As a result, it is possible not only to disturb a laminar flow 41 near the catalyst face of the flow passage (the gas flow passage), but also to violently stir a gas flow 6 in the central portion of the passage, and it is possible to dramatically enhance the efficiency of contact with the catalyst.

Furthermore, an opening 30 is formed in the portion where the stirring part (the lead part) 3 was cut and raised. A pressure difference due to the turbulence of the gas stirred by the stirring part (the lead part) 3 facilitates the flow of the gas in other flow passages through the opening 30, enabling the reaction efficiency of the catalyst to be further enhanced. In particular, when the stirring part (the lead part) 3 is installed in such a manner as to come into contact with the first flat-plate part 1 and the second flat-plate part 10 in an extending manner from the first flat-plate part 1 to the second flat-plate part 10, the pressure difference due to the turbulence increases, making it possible to facilitate the flow of the gas in other flow passages through the opening 30.

In this case, as shown in FIG. 5 or FIG. 6, the stirring parts (the lead parts) 3 are folded alternately in opposite directions, and as shown in FIG. 7, the lead parts 33 provided in the first flat-plate part 1 and the lead parts 34 provided in the second flat-plate part 10 are folded in substantially the same direction and are caused to be present alternately in the direction 4 in which the exhaust gas flows, whereby it is possible to efficiently facilitate the flow of the gas in other flow passages through the opening 30, enabling the effect of catalytic activity (the denitrification rate) to be improved.

Figure 9:
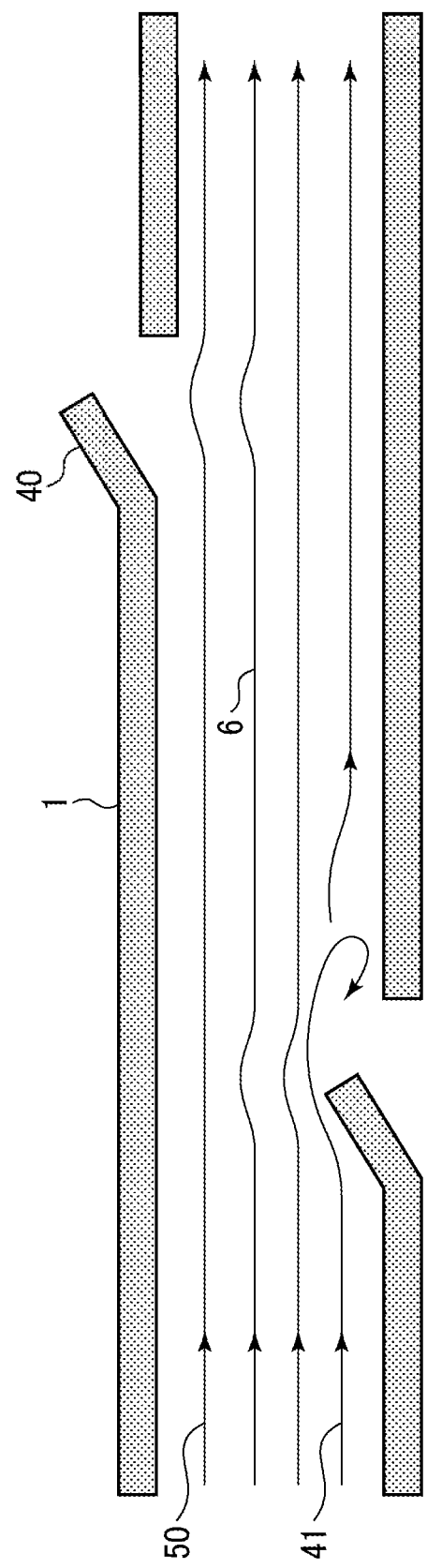
FIG. 9 is a diagram to explain the flow of the exhaust gas in a catalyst structure of a comparative example.
Figure 10:
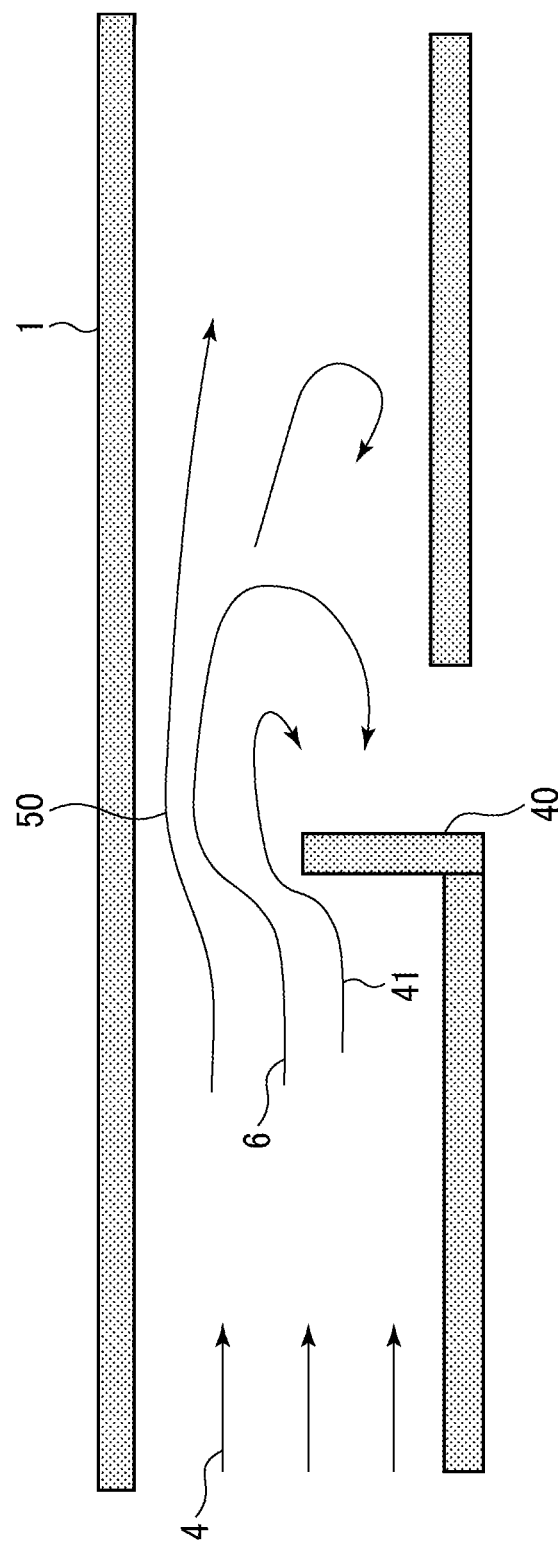
FIG. 10 is a diagram to explain the flow of the exhaust gas in a catalyst structure of a comparative example.

On the other hand, as shown in FIGS. 9 and 10, in the comparative examples, a weir-like protrusion 40 is provided in the flat part of the catalyst, and this weir-like protrusion 40 prevents the generation of a gas flow boundary layer formed on the gas-catalyst surfaces. However, this only disturbs a laminar flow 41 near the catalyst face where the weir-like protrusion 40 is provided and it is impossible to sufficiently stir the gas flow 6 in the central portion of the passage and a laminar flow 50 of the catalyst face where there is no protrusion. In the case where the weir-like protrusion 40 of the comparative examples is sufficiently small in comparison with the intervals of catalyst elements, the weir-like protrusion 40 performs the function of preventing an increase in gas diffusion resistance. However, if the size of the weir-like protrusion 40 of the comparative examples is increased in order to stir the gas flow 6 in the central portion of the flow passage, this causes an increase in pressure loss.

Next, with the aid of specific embodiments and comparative examples, a description will be given below of results of an experiment which was conducted on the denitrification rate (%) and pressure loss (mmH$_2$O/m). Here, 1 Pa=1.01972×10$^{-1}$ mmH$_2$O/m.

Comparative Example 1

Figure 11:
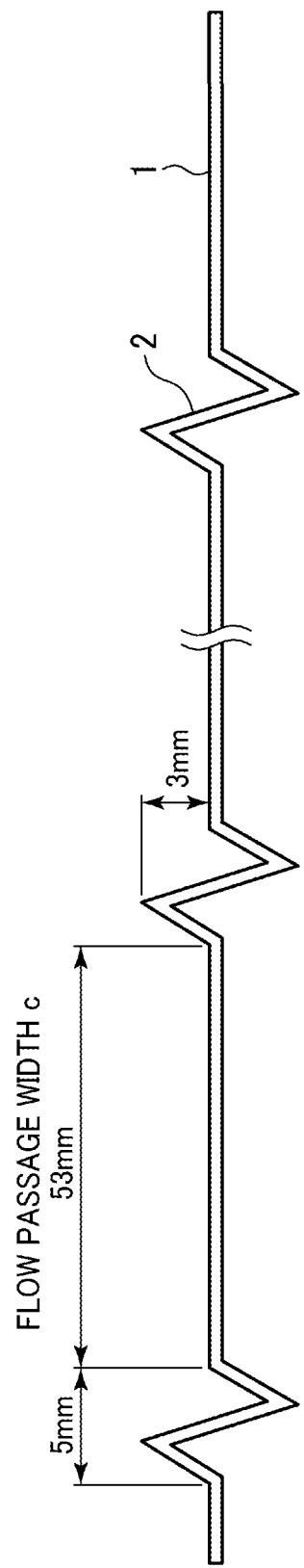
FIG. 11 is a diagram showing a catalyst element used in specific embodiments and comparative examples.
Figure 12:
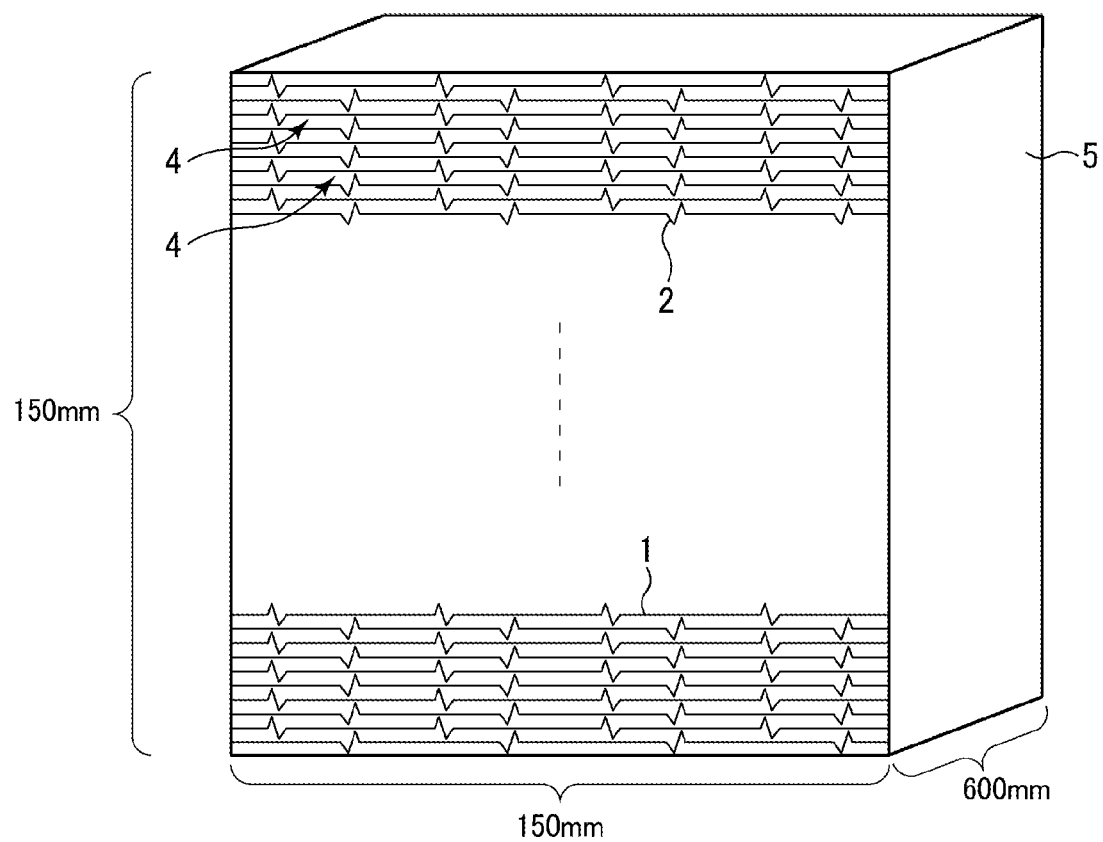
FIG. 12 is a diagram showing a stacked catalyst structure in which catalyst elements are formed as stacked products.

One point seven kg of ammonium paramolybdate ((NH$_4$)$_6$.Mo$_7$O$_{24}$.4H$_2$O), 1.3 kg of ammonium metavanadate (NH$_4$VO$_3$), and 1.7 kg of oxalic acid were added to 13.5 kg of titanium oxide powder (specific surface area: 300 mm$^2$/g, SO$_4$ content: 3.4 wt %), and were kneaded by a kneader for 1 hour during water addition, whereby a paste with a water content of approximately 34 wt % was obtained. Two point three kg of caolin-base ceramic fiber was added to this paste, and the mixture was further kneaded. This paste was applied to the meshes and surface of a metal lath base (width 490 mm, thickness 0.15 mm) made of SUS430 using a roller press to produce a flat plate, and a plate-like catalyst element (flat-plate part) with a thickness of approximately 0.7 mm was obtained. And as shown in FIG. 11, after the formation of wavy spacers 2 using a pressing machine in this catalyst element, the catalyst element was cut to a length 600 mm and width 150 mm and a catalyst element including the spacers 2 was obtained. And as shown in FIG. 12, the catalyst elements (FIG. 11) were stacked and the stacked product was put in an outer frame 5 made of metal. After that, a lid was set while the stacked product was pressurized from above and a stacked catalyst structure (150 mm square (height 150 mm, width 150 mm), length 600 mm) was obtained. After the stacked catalyst structure was air-dried for 24 hours, the stacked catalyst structure was fired at 500° C. for 2 hours for use in Comparative Example 1 while air was caused to flow.

Comparative Example 2

Figure 13:
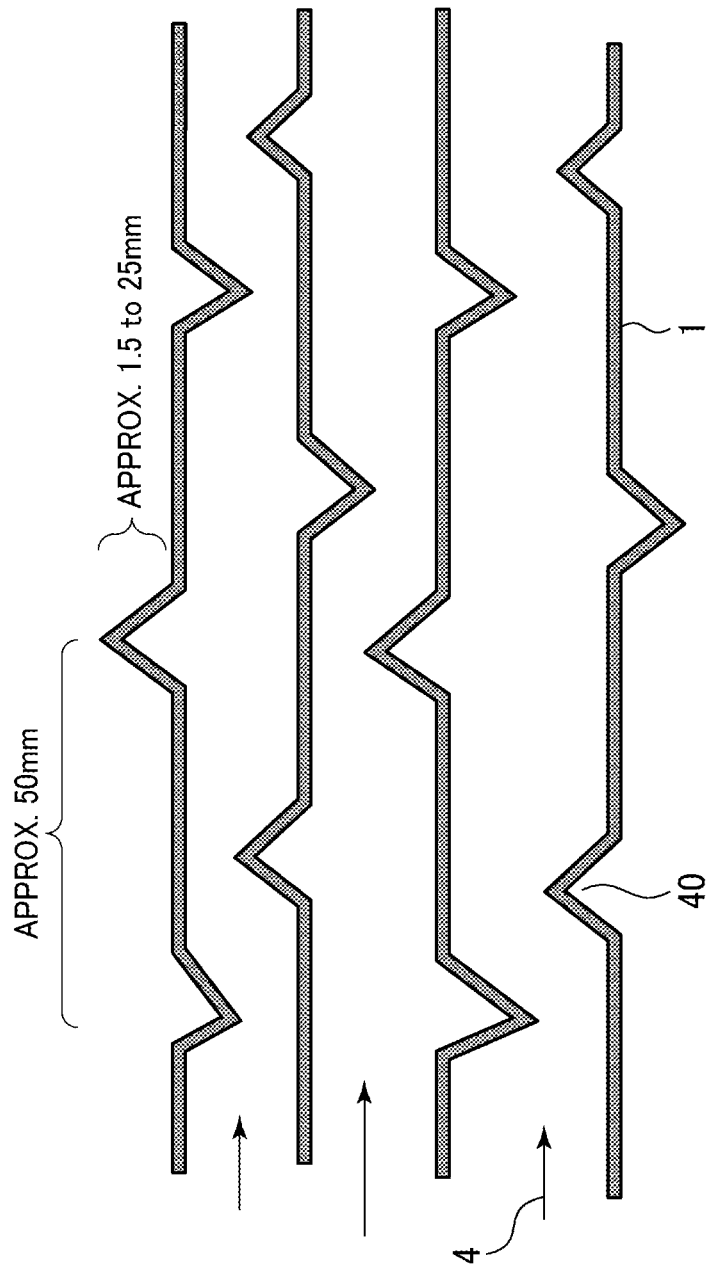
FIG. 13 is a diagram showing a catalyst element of Comparative Example 2.

As shown in FIG. 13, by using a chisel, the catalyst elements (FIG. 11) were subjected to strike-raise working at intervals of approximately 50 mm longitudinally and catalyst elements including weir-like protrusions 40 of approximately 1.5 mm in height and approximately 25 mm in width were obtained. And as shown in FIG. 12, a stacked catalyst structure in which the catalyst elements (FIG. 13) are stacked was fabricated for use in Comparative Example 2.

Embodiment 1

Figure 14:
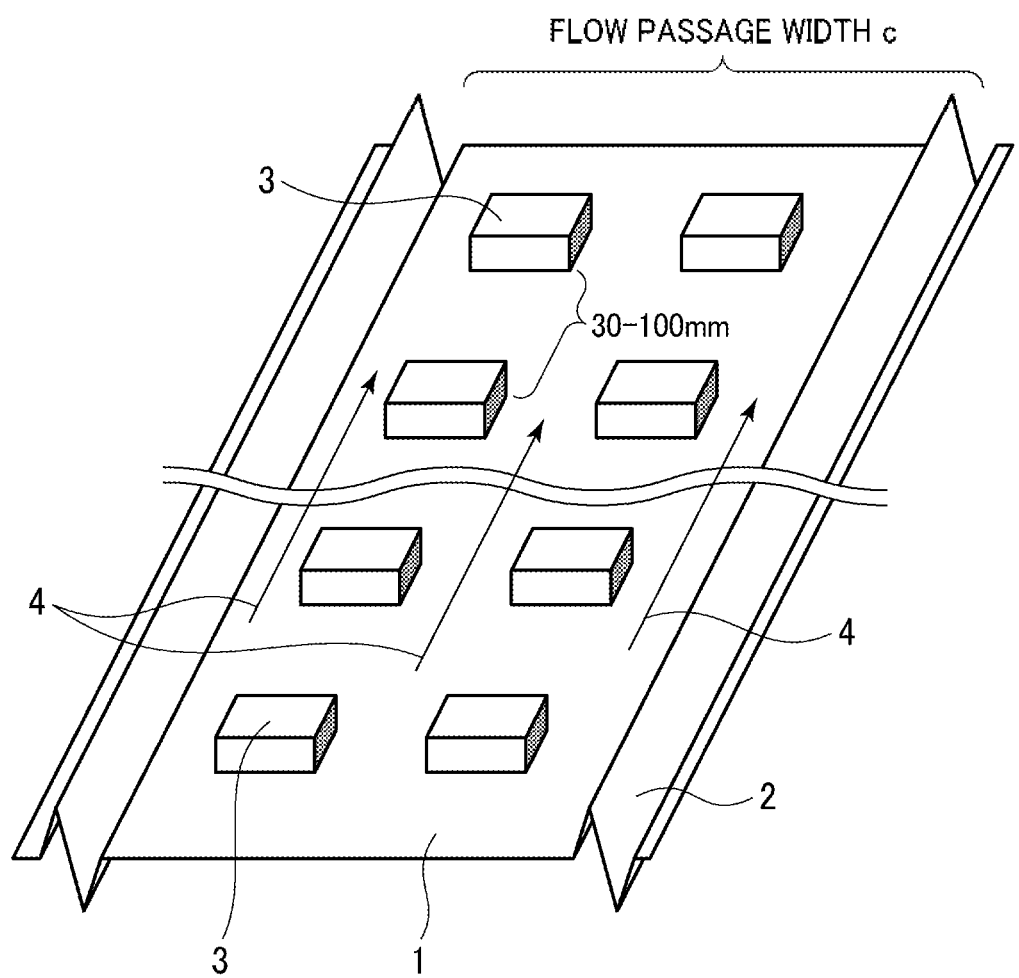
FIG. 14 is a diagram showing a catalyst element of Embodiment 1.

As shown in FIG. 14, a catalyst structure obtained by providing inorganic fiber impregnated with a constituent having catalytic activity to the exhaust gas (the stirring part 3) in the catalyst elements (FIG. 11) was fabricated as Embodiment 1. One point seven kg of ammonium paramolybdate ((NH$_4$)$_6$.M$_7$O$_{24}$.4H$_2$O), 1.3 kg of ammonium metavanadate (NH$_4$VO$_3$), and 1.7 kg of oxalic acid were added to 13.5 kg of titanium oxide powder (specific surface area: 300 mm$^2$/g, SO$_4$ content: 3.4 wt %), and were kneaded by a kneader for 1 hour during water addition. After that, granules in the form of column 3 φ extruded by an extrusion granulating machine were dried by a fluid-bed dryer and fired at 500° C. for 2 hours and the granules were pulverized by a hammer mill to obtain a catalyst powder. A catalyst slurry was prepared by adding 6 kg of water to 4 kg of this catalyst powder. A caolin-base inorganic fiber bulk compact (thickness (height) 3 mm, 1 cm square (width 10 mm, length 10 mm)) was impregnated with this catalyst slurry and fabricated as inorganic fiber of Embodiment 1 (the stirring part 3). As shown in FIG. 14, the inorganic fiber of Embodiment 1 (the stirring part 3) was arranged on the catalyst elements (FIG. 11) at intervals of approximately 50 mm.

The catalyst elements in which the inorganic fiber of Embodiment 1 (the stirring part 3) is arranged, were fabricated as a stacked product, and as shown in FIG. 12, after the stacked product was put in an outer frame 5 made of metal, a lid was set while the stacked product was being pressurized from above and a stacked catalyst structure was obtained. After the stacked catalyst structure was air-dried for 24 hours, the stacked catalyst structure was fired at 500° C. for 2 hours for use in Embodiment 1 while air was caused to flow.

Embodiment 2

As shown in FIGS. 3(a) and 3(b), a catalyst element (FIG. 11) was subjected to cut-raise working using a working die and a stirring part (a lead part) 3 was formed by folding an incision for use in Embodiment 2. The stirring part (the lead part) 3 of Embodiment 2 was 18 mm in length a and 8 mm in width b. And as shown in FIG. 7, catalyst elements in which the stirring parts (the lead parts) 3 of Embodiment 2 are arranged in the gas flow direction 4 at intervals of approximately 50 mm were put into a stacked product. As shown in FIG. 12, after the stacked product was put in an outer frame 5 made of metal, a lid was set while the stacked product was being pressurized from above and a stacked catalyst structure was obtained. After the stacked catalyst structure was air-dried for 24 hours, the stacked catalyst structure was fired at 500° C. for 2 hours for use in Embodiment 2 while air was caused to flow. In this case, as shown in FIG. 7, the catalyst elements were stacked so that the lead parts 33 provided in the first flat-plate part 1 and the lead parts 34 provided in the second flat-plate part 10 are present alternately in the gas flow direction 4. Furthermore, the catalyst elements were stacked so that the lead parts 34 provided in the second flat-plate part 10 and the lead parts 35 provided in the third flat-plate part 11 are present alternately in the gas flow direction 4.

Embodiment 3

Embodiment 3 is such that the stirring part (the lead part) 3 of Embodiment 2 was 25 mm in length a and 15 mm in width b.

Embodiment 4

Embodiment 4 is such that the stirring part (the lead part) 3 of Embodiment 2 was 20 mm in length a and 10 mm in width b.

Embodiment 5

As shown in FIG. 6, Embodiment 5 is such that the folding directions of the stirring parts (the lead parts) 3 of Embodiment 2 are alternately opposite directions. In this case, as shown in FIG. 6, it is ensured that the stirring part (the leading part) 3 is present neither in the first flat-plate part 1 nor in the third flat-plate part 11.

Embodiment 6

Embodiment 6 is such that the intervals of the stirring parts (the lead parts) 3 of Embodiment 2 (approximately 50 mm) were changed to approximately 100 mm in the gas flow direction 4.

With the aid of the stacked catalyst structures of Embodiments 1 to 6 and Comparative Examples 1 and 2 described above, the denitrification rate and pressure loss of each of the stacked catalyst structures were measured under the conditions shown in FIG. 15. FIG. 16 shows the measurement results.

As shown in FIG. 16, for the denitrification rate, all of Embodiments 1 to 6 showed higher denitrification rates (86 to 93%) than Comparative Example 1 (65%) and Comparative Example 2 (83%). In particular, Embodiment 4 showed the highest denitrification rate (93%). For the pressure loss, Embodiments except Embodiment 3 showed lower pressure losses (42 to 67 mmH$_2$O/m) than Comparative Example 2 (78 mmH$_2$O/m). In particular, Embodiment 6 (intervals of approximately 10 mm) showed the lowest pressure loss (42 mmH$_2$O/m). Also in Embodiment 3, it was shown that activity can be enhanced without an increase in pressure loss.

In this manner, according to the embodiments, the denitrification rate was improved compared to the comparative examples. This is because it was possible to efficiently stir the gas flow. According to the embodiments, it is also possible to improve the denitrification rate while preventing an increase in pressure loss. That is, because of the adoption of a catalyst structure which traverses catalyst elements provided adjacent to each other, it is possible to improve the nitration rate while preventing an increase in pressure loss by a simple construction.

Furthermore, according to the embodiments, the denitrification performance is increased to enable the consumption of catalysts to be substantially reduced (resource savings) and it is possible to reduce cost and environmental load. And an increase in pressure loss is prevented to enable the load of operation power of exhaust gas denitrification devices to be reduced and it is possible to achieve resource savings and energy savings.

That is, concerning the catalyst structure of the embodiment, in order to realize a geometry having high productivity and a great activity improving effect, the present inventors carried out the pointing-out of problems in conventional techniques which are to be solved. Among the conventional techniques, as shown in Patent Literature 4 and the like, for methods of providing weir-like protrusions, various precious contrivances were carried out concerning methods of forming weir-like structures. What forms the basis of these contrivances is, as shown in FIGS. 10 and 13, to reduce an increase in gas diffusion resistance by laminar flow formation by disturbing the gas using a weir-like object provided in the parallel flat-plate parts. The effect is relatively great when the protrusions are small. However, when the size of the protrusions is increased in order to further enhance the effect, only an increase in pressure loss becomes remarkable compared to a decrease in gas diffusion resistance. It can be said that this point is a fundamental problem in measures to improve activity by weir-like protrusions.

On the other hand, as shown in Patent Literature 5, measures to improve activity by providing a round bar and a net-like gas stirring body in the central portion of the parallel faces of a parallel flow passage are intended for facilitating gas diffusion to the catalyst by disturbing the gas in the central portion of the flow passage away from the catalyst surface, and are essentially different from the invention of Patent Literature 4. And according to studies of the present inventors, the degree of improvement in activity relative to the same increase in pressure loss is great and this is a method excellent in principle. However, it is necessary that a net-like object or a bar-like object which are different from a plate-like catalyst forming a flow passage be formed in the central portion of the flow passage. Because these are prepared in a line separate from the catalyst manufacturing process and are alternately stacked, there is an increase in the number of manufacturing steps and this method is disadvantageous in terms of manufacturing speed and cost.

Therefore, the present inventors devoted themselves to studies on techniques to improve activity by disturbing the gas in the central portion of the gas flow passage of the latter method excellent in principle, and as a result, they decided to install a gas stirring body orthogonal to the catalyst face of the parallel part as shown in FIGS. 1(*a*) and 1(*b*) etc. by changing the idea of conventional techniques of installing a net-like body and a bar-like body parallel to the catalyst face of the parallel part of a parallel plate-like flow passage. That is, the present inventors found out that the same high central part stirring effect as in conventional techniques is obtained by providing a gas stirring body in the central portion of a wide side of a rectangular flow passage consisting of parallel plate-like catalysts and spacers, and reached the present invention.

Furthermore, the present inventors studied a difference in effect between the present invention shown in FIG. 1 and the case where a conventional bar-like stirring body is installed, and as a result, they found out that as shown in FIGS. 2(*a*) and 2(*b*), the contact ratio of the gas and the stirring body is increased by providing the gas stirring body in an inclined manner and that the resistance of the gas which flows by bypassing the gas stirring body can be substantially reduced.

Moreover, as shown in conventional techniques, protrusions intended for destroying a laminar flow formed on the catalyst surface are small for the intervals of a flow passage and the turbulence of the gas flow was limited to the surface layer part (see FIG. 9, for example). In contrast to this, the lead-like gas stirring body of this embodiment is formed in such a manner as to come into contact with both upper and lower faces of the flow passage, and as a result, as shown in FIG. 8, the lead-like gas stirring body has the function of dramatically enhancing the efficiency of contact with the catalyst not only by disturbing the laminar flow on the catalyst face, but also by violently stirring the gas in the central portion of the flow passage. In addition, a pressure difference due to this turbulence of the gas facilitates the flow of the gas in other flow passages through an opening formed in an area left behind after cutting and raising the lead-like stirring part, enabling the reaction efficiency of the catalyst to be further enhanced.

Although the embodiments of the present invention were described in the foregoing, the present invention is not limited to these embodiments and changes and modifications may be made in the invention within the scope described in the claims.

Although the exhaust gas denitrification catalyst structure was described in the embodiments, it is also possible to remove exhaust gas constituents other than nitrogen oxides by changing the catalyst constituent.

Although in the embodiments the intervals of the stirring parts (the lead parts) 3 in the gas flow direction 4 are 50 mm or 100 mm, the intervals may be appropriately changed according to the intervals (the pitch) of the catalyst elements. In the case where the pitch is 3 mm, a good effect can be obtained by arranging the stirring parts (the lead parts) 3 at the intervals of not less than 20 mm. Usually, a high effect is obtained by arranging the stirring parts (the lead parts) 3 at the intervals of 30 mm to 100 mm.

It is necessary only that the width of the stirring part (the lead part) 3 be ⅕ to ½ of the flow passage width c of the gas flow passage. Also, it is necessary only that the folding angle θ of the lead part be not less than 5° but not more than 30°, and in the case where the intervals of the catalyst elements are 3 mm, if the length a of the lead part is 15 mm to 25 mm, the pressure loss is small and the effect of catalyst activity tends to increase.

INDUSTRIAL APPLICABILITY

The catalyst structure of the present invention has the effect that the denitrification rate can be improved while preventing an increase in pressure loss by efficiently stirring a gas flow by a simple construction and is useful as a catalyst structure for exhaust gas cleaning.

The invention claimed is:

1. A catalyst structure, comprising: multiple catalyst elements, each having a flat-plate part which supports, on a surface thereof, a constituent having catalytic activity to an exhaust gas, and a plurality of spacers extending in a direction in which the exhaust gas flows and arranged on the flat-plate part equidistantly in a direction perpendicular to a flow of the exhaust gas, the catalyst elements being stacked via the spacers and formed with a stirring part for stirring the exhaust gas, the stirring part being provided in a gas flow passage formed by two of the flat-plate parts adjacent in a stacking direction of the catalyst elements and two consecutive spacers of the plurality, the stirring part having: a plurality of consecutive lead parts formed at prescribed intervals in the direction in which the exhaust gas flows by folding an incision provided in a flat-plate part of each of the gas flow passages, and a plurality of openings formed by the incisions of the lead parts, each of the lead parts having a width in a direction perpendicular to the flow of the exhaust gas, and being folded in substantially a same direction with respect to a direction in which a downstream side of the exhaust gas flows, adjacent catalyst elements being arranged so that the lead parts are present alternately in the direction in which the exhaust gas flows; and wherein the catalyst elements adjacent in the stacking direction are arranged so that the lead parts formed in one of the catalyst elements is present in a position corresponding to a flat part between two of the lead parts, adjacent in a direction in which the exhaust gas flows, of the other of the catalyst elements.

2. The catalyst structure according to claim 1, wherein the lead parts of each catalyst element extend into contact with the flat-plate parts of an adjacent catalyst element.

3. The catalyst structure according to claim 1, wherein a length of each lead part between two adjacent catalyst elements is not less than 5 times but not more than 10 times an interval between the two adjacent catalyst elements.

4. The catalyst structure according to claim 1, wherein the lead parts are folded at a prescribed angle not less than 7° but not more than 30°.

5. The catalyst structure according to claim 1, wherein the stirring parts are present in multiple numbers in the direction in which the exhaust gas flows, and intervals between consecutive stirring parts are not less than 30 mm but not more than 100 mm.

6. The catalyst structure according to claim 1, wherein the width of the lead parts is not less than ⅕ but not more than ½ of a width of the gas flow passage.

* * * * *